Feb. 13, 1962 W. T. WALLACE 3,020,880
WORK PIECE HOLDER
Filed Dec. 14, 1959
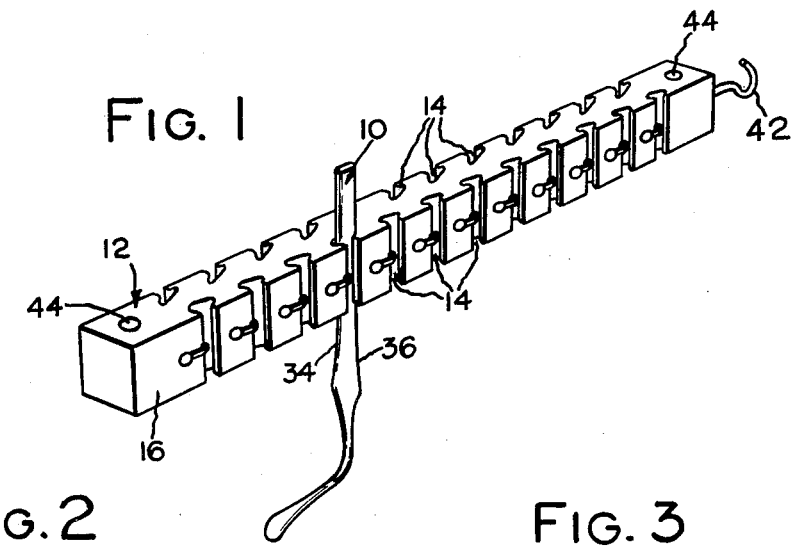
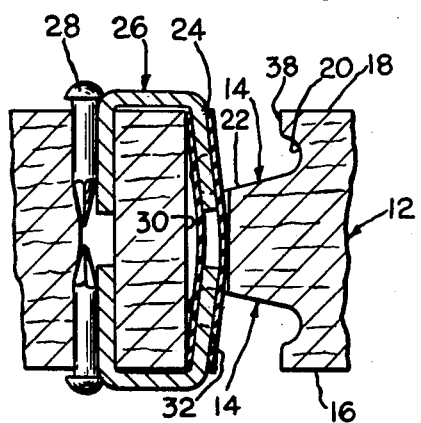
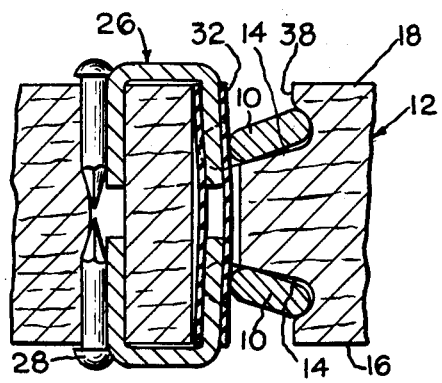
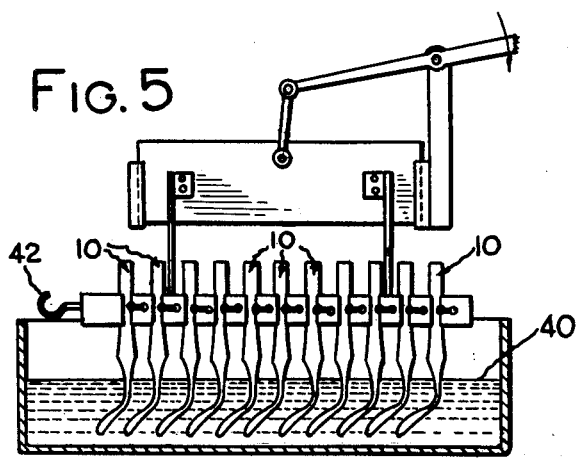
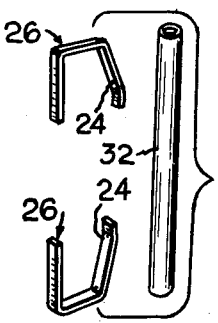
WILLIAM T. WALLACE
INVENTOR.
BY Frank C. Parker
H Jmon Stone
ATTORNEYS

United States Patent Office 3,020,880
Patented Feb. 13, 1962

3,020,880
WORK PIECE HOLDER
William T. Wallace, Irondequoit, N.Y., assignor to Bausch & Lomb Incorporated, a corporation of New York
Filed Dec. 14, 1959, Ser. No. 859,180
3 Claims. (Cl. 118—503)

The present invention pertains to an improved holder for holding slat-like work pieces for dipping operations and the like.

One important object of the present invention is to provide an improved holder for securely but removably holding a slat-like work piece for dipping operations and the like.

Other objects of the invention are to provide an improved holder of this type in which the work piece may be easily and quickly mounted and demounted when desired, yet which holds the work piece securely in position; to provide an improved holder of this type especially adapted for holding relatively soft work pieces such as, for example, work pieces of anodized aluminum, without scratching or otherwise damaging them; to provide an improved holder of this type capable of securely holding the work pieces even when the holder is subjected to relatively strong vibration, and in general to provide an improved holder of this type which is relatively simple and inexpensive to manufacture yet rugged and long-wearing in use.

The foregoing and other objects and advantages of the invention will become apparent in the following description of a representative embodiment thereof, taken in conjunction with the drawing, wherein:

FIG. 1 is a perspective view of a work piece holder according to a preferred embodiment of the invention.

FIG. 2 is a fragmentary, horizontal sectional view of the holder shown in FIG. 1, illustrating the holder in an empty condition.

FIG. 3 is a view generally similar to the view of FIG. 2 but showing the holder with two work pieces in place therein.

FIG. 4 is a perspective view of a pair of springs and a protective sleeve therefor, which are incorporated in the holder shown in the preceding figures.

FIG. 5 is a partly schematic, side elevational view, partly in section, showing the holder illustrated in FIG. 1 loaded with eyeglass temples as used in a dipping operation in the production of the temples.

The holder of the present invention is especially well suited for holding eyeglass temples and other slat-like work pieces, but it may be readily adapted for holding many other different kinds of work pieces of many different shapes for processing them through any of many different work operations. The holder provides for relatively quick, and highly efficient loading and unloading of the work pieces, yet it holds the work pieces securely and does not permit them to slip or change positions even under relatively severe vibration.

The holder shown in the drawing is arranged for holding a plurality of, for example, twelve pairs of eyeglass temples 10 or other similar slat-like work pieces, and includes a body 12 of generally square or rectangular cross-sectional shape. Cylindrical recesses 14 of generally C-shape horizontal section are formed along the two opposite sides 16 and 18 of the body 12 for receiving the work pieces 10.

Each one of the recesses 14 has a reentrant bight portion 20 and an inner wall 22 immediately adjacent thereto that slopes inwardly away from the bight portion 20. A resiliently yieldable retainer member in the form of the free leg 24 of a U-shaped spring 26 is positioned in each one of the recesses 14 opposite from the bight portion 20 for urging the work piece 10 edgewise into the bight portion 20. The springs 26 are fixed to the body 12 in any convenient manner such as by the wedging nails 28 illustrated, and their inner legs 24 extend at least close to the inner walls 22 of the recesses. As illustrated, a hole 30 is formed in the body 12 extending between opposite ones of the recesses 14 for receiving the ends of the free leg portions 24 of the springs. The free legs 24 preferably are covered with a relatively soft, flexible material such as the plastic covered woven fabric tubing sections 32 shown, each one of which extends over and covers two opposite ones of the free legs 24. The tubing distributes the spring load on the work pieces 10 to minimize any tendency of the springs 26 to dent into the work pieces.

The work pieces 10 may be readily inserted into the recesses 14 by pressing one edge 34 against the spring 26 near the inner end thereof adjacent to the inner wall 22 of the recess. The work piece 10 is then twisted to force it into the recess 14 with its flat side parallel to the inner wall 22. During this action, the work piece stresses the spring 26 as the opposite edge 36 of the work piece passes over the lip 38 of the recess with an over-center action into the bight portion 20 of the recess.

The inner wall 22 of the recess is preferably sloped sufficiently inwardly to permit the work piece 10 to angle inwardly from the bight portion 20 to the spring 26 so that the free leg 24 of the spring bears inwardly on the edge 34 of the work piece when the work piece is inserted in the holder. The spring 26 urges the work piece 10 against the bight portion 20 of the recess, which provides a relatively long bearing surface for keeping the work piece 10 properly in alignment with respect to the holder body 12. The relatively long bearing surface of the recess in the bight portion 20 also provides a relatively strong frictional engagement to prevent slipping of the work piece 10 in the recess.

The body 12 of the holder is preferably made of a relatively rigid yet smooth surface material such as hard wood, molded plastic or the like, depending upon the nature of the work pieces 10 it is desired to hold. In the case of decoratively finished anodized aluminum work pieces such as the eyeglass temples 10 illustrated, it is desired to avoid high localized pressures on the work pieces in order to avoid denting them. Many work pieces of this type are especially sensitive to rough handling which may cause small cracks to form in the anodized "skin." In such cases, a relatively soft surfaced material such as wood or plastic is used to form the body 12 of the holder, and all of the corners (not separately designated) of the body surrounding the recesses 14 are smoothly finished and slightly rounded.

The springs 26 may be made of any desired resilient material such as, for example, Phosphor bronze, steel, or any other material having a resilience and yieldability compatible with the strength characteristics and damage susceptibility of the work pieces 10.

The holder may be used, for example, as illustrated in FIG. 5 for partly immersing the eyeglass temples 10 in a bath 40 of a plastic monomer, or other coating or processing material, for coating portions of the temples with the monomer, which may then be subsequently cured. A hook 42 may be attached at one end of the holder for supporting it on a rail or overhead track, and alignment holes 44 may be provided for receiving aligning pins (not shown) when it is desired to position the holder accurately with respect to some other equipment.

I claim:
1. A work piece holder for holding a slat-like work piece comprising a body of generally rectangular cross sectional shape having a cylindrical recess, said recess being open at both ends and of generally C-shaped cross-sectional configuration, and a resilient member for engagement against the edge of a slat-like work piece when the work piece is placed in said recess with its flat side generally parallel to the inner wall of said recess, a bight portion between said inner wall and the mouth of said recess, said resilient member extending into said recess opposite from said bight portion, the inner wall of said recess sloping generally outwardly away from said resilient member and generally inward and into said bight portion so that when the work piece is so positioned said resilient member bears inwardly upon the edge of the work piece.

2. A work piece holder for holding eyeglass temples for processing comprising a body of generally rectangular cross sectional shape having a cylindrical recess of generally C-shaped cross-sectional configuration, said recess having a relatively flat inner wall and a bight portion between said inner wall and the mouth of said recess, a spring mounted on said body and having a portion disposed in said recess opposite from said bight portion and yieldable in a direction away from said bight portion for urging an eyeglass temple into said bight portion when the temple is placed in said recess.

3. A work piece holder for holding eyeglass temples for processing comprising an elongated body of generally rectangular cross-sectional shape and having a plurality of generally cylindrical recesses arranged along opposite sides thereof, said recesses on one side of said body being in register with said recesses on the opposite side, each one of said recesses being open at both ends and of generally C-shaped cross-section, each one of said recesses having a relatively flat inner wall and a bight portion between said inner wall and the mouth of the recess, said body having apertures connecting opposite ones of said recesses, a plurality of springs fixed to said body at points spaced from said recesses, each one of said springs having a free leg portion extending into one of said recesses opposite from said bight portion thereof and in general alignment with one of said apertures, and relatively soft pieces of tubing extending through said apertures and covering said free leg portions of said springs, and said free leg portion yieldable in a direction away from said bight portion for urging an eyeglass temple into said bight portion when the temple is placed in said recess.

References Cited in the file of this patent
UNITED STATES PATENTS

| | | |
|---|---|---|
| 1,544,694 | Speidel | July 7, 1925 |
| 1,894,164 | Doht | Jan. 10, 1933 |